US011641377B2

(12) United States Patent
Denker et al.

(10) Patent No.: US 11,641,377 B2
(45) Date of Patent: May 2, 2023

(54) SYSTEM FOR MAPPING INFORMATION SECURITY CONFIGURATIONS ACROSS TECHNOLOGY PLATFORMS

(71) Applicant: Cyborg Security, Inc., Lake Mary, FL (US)

(72) Inventors: Brandon Denker, Kissimmee, FL (US); Austin Jackson, Austin, TX (US); Mike Mitchell, Lake Mary, FL (US); Nick Allen, Arvada, CO (US)

(73) Assignee: CYBORG SECURITY, INC., Lake Mary, FL (US)

( * ) Notice: Subject to any disclaimer, the term of this patent is extended or adjusted under 35 U.S.C. 154(b) by 210 days.

(21) Appl. No.: 17/333,393

(22) Filed: May 28, 2021

(65) Prior Publication Data
US 2022/0094714 A1   Mar. 24, 2022

Related U.S. Application Data

(60) Provisional application No. 63/081,529, filed on Sep. 22, 2020.

(51) Int. Cl.
*H04L 9/40* (2022.01)
*G06N 7/02* (2006.01)

(52) U.S. Cl.
CPC ............ *H04L 63/20* (2013.01); *G06N 7/02* (2013.01)

(58) Field of Classification Search
CPC .......... H04L 63/20; G06N 7/02; G06N 5/048; G06N 7/01
USPC ............................................................ 726/1
See application file for complete search history.

(56) References Cited

U.S. PATENT DOCUMENTS

| | | | |
|---|---|---|---|
| 6,311,269 | B2 | 10/2001 | Luckenbaugh et al. |
| 7,376,969 | B1 | 5/2008 | Njemanze et al. |
| 7,844,999 | B1 | 11/2010 | Aguilar-Macias et al. |
| 8,056,130 | B1 | 11/2011 | Njemanze et al. |
| 8,578,441 | B2 | 11/2013 | Giles et al. |
| 9,100,422 | B1 | 8/2015 | Tidwell et al. |
| 9,501,535 | B2 | 11/2016 | Cannaliato et al. |
| 9,811,562 | B2 | 11/2017 | Tidwell et al. |
| 10,127,273 | B2 | 11/2018 | Dickey |
| 10,176,321 | B2 | 1/2019 | Abbasi et al. |
| 10,257,059 | B2 | 4/2019 | Dickey |

(Continued)

*Primary Examiner* — Kambiz Zand
*Assistant Examiner* — Aubrey H Wyszynski
(74) *Attorney, Agent, or Firm* — Moore & Van Allen PLLC

(57) ABSTRACT

Systems, computer program products, and methods are described herein for mapping information security configurations across technology platforms. The present invention is configured to electronically receive, from a computing device associated with a technology infrastructure, one or more responses to one or more queries; extract one or more security information and event management (SIEM) fields from the one or more responses; map the one or more SIEM fields to a generic content schema of a common information security model; generate a unique SIEM map for the technology infrastructure based on at least mapping the one or more SIEM fields to the generic content schema of the common information security model; generate a use case for the technology infrastructure using the common information security model; and transform the use case generated using the common information security model using the unique SIEM map.

20 Claims, 3 Drawing Sheets

(56) References Cited

U.S. PATENT DOCUMENTS

| | | |
|---|---|---|
| 10,348,583 B2 | 7/2019 | Dickey |
| 10,474,680 B2 | 11/2019 | Ramani et al. |
| 10,599,668 B2 | 3/2020 | McLean |
| 10,721,275 B2 | 7/2020 | Kung et al. |
| 10,726,037 B2 | 7/2020 | Robichaud |
| 10,764,329 B2 | 9/2020 | Sander et al. |
| 10,791,138 B1 | 9/2020 | Siddiqui et al. |
| 10,949,420 B2 | 3/2021 | Curtis et al. |
| 10,977,271 B2 | 4/2021 | McLean |
| 2016/0156664 A1* | 6/2016 | Nagaratnam ........... H04L 63/20 726/1 |
| 2017/0286038 A1 | 10/2017 | Li et al. |
| 2017/0286525 A1 | 10/2017 | Li et al. |
| 2019/0238431 A1 | 8/2019 | Dickey |
| 2020/0019891 A1 | 1/2020 | Poirel et al. |
| 2020/0042651 A1 | 2/2020 | Curtis et al. |
| 2020/0127893 A1* | 4/2020 | Hume ................... H04L 41/065 |
| 2020/0250184 A1 | 8/2020 | Frampton et al. |
| 2020/0272734 A1* | 8/2020 | Tora ................... H04L 63/1425 |
| 2020/0279055 A1 | 9/2020 | Nambiar et al. |
| 2020/0285764 A1 | 9/2020 | Nitzan |
| 2020/0351307 A1 | 11/2020 | Vidas et al. |
| 2021/0021621 A1 | 1/2021 | Janakiraman |
| 2021/0073377 A1 | 3/2021 | Coull et al. |

* cited by examiner

SYSTEM FOR MAPPING INFORMATION SECURITY CONFIGURATIONS ACROSS TECHNOLOGY PLATFORMS

CROSS REFERENCE TO RELATED APPLICATION

This application claims priority to U.S. Provisional Application Ser. No. 63/081,529, entitled "SYSTEM FOR MAPPING INFORMATION SECURITY CONFIGURATIONS ACROSS TECHNOLOGY PLATFORMS," filed Sep. 22, 2020, which is incorporated herein by reference in its entirety.

FIELD OF THE INVENTION

The present invention embraces a system for mapping information security configurations across technology platforms.

BACKGROUND

The Security Information and Event Management (SIEM) tool in each organization is customized to the organization's environment and their specific needs, such as analysis, alerting, compliance, and/or the like. The difference in SIEM implementations among various organizations lies primarily in how the data is organized and stored. Most SIEM tools have the ability to change how the fields within the data are aggregated, tagged, named, enriched, and stored, including the identifiable terms and indexes. This flexibility creates an infinite number of possible configuration options and mappings.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for mapping information security configurations across technology platforms is presented. The system may include at least one non-transitory storage device; and at least one processing device coupled to the at least one non-transitory storage device, wherein the at least one processing device is configured to: generate one or more queries to be executed on a technology infrastructure; transmit the one or more queries to a computing device associated with the technology infrastructure; electronically receive, from the computing device associated with the technology infrastructure, one or more responses to the one or more queries; extract one or more security information and event management (SIEM) fields from the one or more responses; map the one or more SIEM fields to a generic content schema of a common information security model; generate a unique SIEM map for the technology infrastructure based on at least mapping the one or more STEM fields to the generic content schema of the common information security model; generate a use case for the technology infrastructure using the common information security model; and transform the use case generated using the common information security model using the unique SIEM map.

In some embodiments, mapping the one or more SIEM fields to a generic content schema of the common information security model further comprises comparing the one or more SIEM fields with one or more indices associated with the generic content schema to determine a match.

In some embodiments, the at least one processing device is further configured to: determine the match between the one or more SIEM fields with the one or more indices associated with the generic content schema, wherein determining further comprises determining a likelihood of the match between the one or more SIEM fields and the one or more indices associated with the generic content schema based on at least a predetermined threshold.

In some embodiments, the at least one processing device is further configured to: automatically map the one or more SIEM fields to the one or more indices associated with the generic content schema based on at least a highest likelihood of match between the one or more SIEM fields and the one or more indices associated with the generic content schema.

In some embodiments, the at least one processing device is further configured to: determine that the likelihood of the match between the one or more SIEM fields and the one or more indices associated with the generic content schema is greater than a predetermined threshold; and map the one or more SIEM fields to the one or more indices associated with the generic content schema based on at least determining that the likelihood of the match is greater than the predetermined threshold.

In some embodiments, the at least one processing device is further configured to: determine that the likelihood of the match between the one or more SIEM fields and the one or more indices associated with the generic content schema is lesser than the predetermined threshold; and display, on the computing device of a user, the one or more SIEM fields with the likelihood of the match being lesser than the predetermined threshold.

In some embodiments, the at least one processing device is further configured to: electronically receive, via the computing device of the user, a user input to manually map the one or more SIEM fields with the likelihood of the match being lesser than the predetermined threshold with the one or more indices associated with the generic content schema.

In some embodiments, the at least one processing device is further configured to: determine the likelihood of the match between the one or more SIEM fields and the one or more indices associated with the generic content schema, wherein determining further comprises: initiating a probabilistic fuzzy logic engine; extracting, using the probabilistic fuzzy logic engine, one or more identifiers associated with the one or more SIEM fields; comparing the one or more identifiers associated with the one or more SIEM fields with one or more predetermined identifiers associated with the one or more indices, wherein the one or more predetermined identifiers are associated with one or more predetermined weights; and determining the likelihood of the match based on at least a weighted matching of the one or more identifiers associated with the one or more SIEM fields and the one or more predetermined identifiers associated with the one or more indices.

In another aspect, a computer program product for mapping information security configurations across technology platforms is presented. The computer program product may include a non-transitory computer-readable medium comprising code causing a first apparatus to: generate one or more queries to be executed on a technology infrastructure;

transmit the one or more queries to a computing device associated with the technology infrastructure; electronically receive, from the computing device associated with the technology infrastructure, one or more responses to the one or more queries; extract one or more security information and event management (SIEM) fields from the one or more responses; map the one or more SIEM fields to a generic content schema of a common information security model; generate a unique SIEM map for the technology infrastructure based on at least mapping the one or more SIEM fields to the generic content schema of the common information security model; generate a use case for the technology infrastructure using the common information security model; and transform the use case generated using the common information security model using the unique SIEM map.

In yet another aspect, a method for mapping information security configurations across technology platforms is presented. The method may include generating one or more queries to be executed on a technology infrastructure; transmitting the one or more queries to a computing device associated with the technology infrastructure; electronically receiving, from the computing device associated with the technology infrastructure, one or more responses to the one or more queries; extracting one or more security information and event management (SIEM) fields from the one or more responses; mapping the one or more SIEM fields to a generic content schema of a common information security model; generating a unique SIEM map for the technology infrastructure based on at least mapping the one or more SIEM fields to the generic content schema of the common information security model; generating a use case for the technology infrastructure using the common information security model; and transforming the use case generated using the common information security model using the unique SIEM map.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
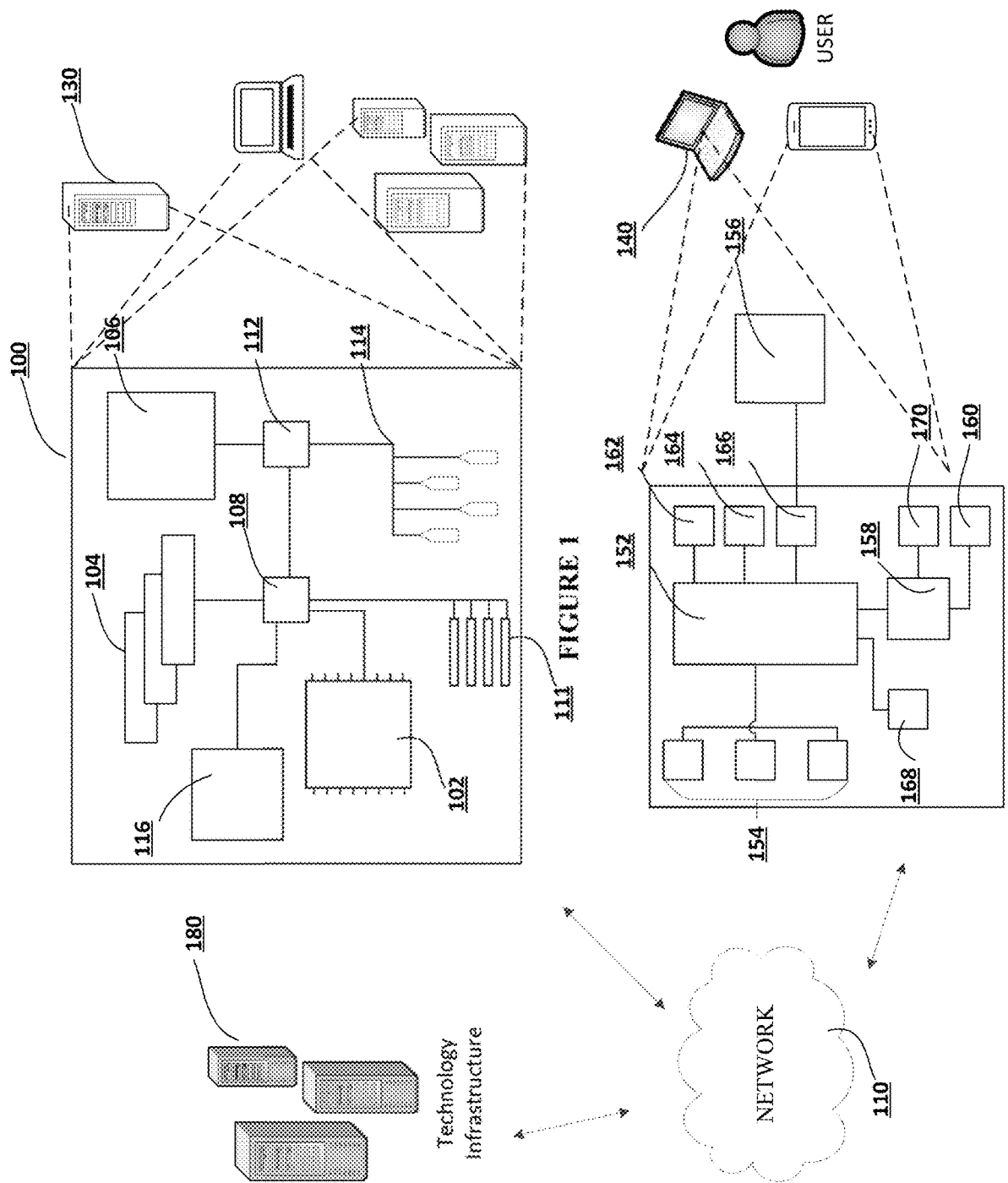
Figure 2:
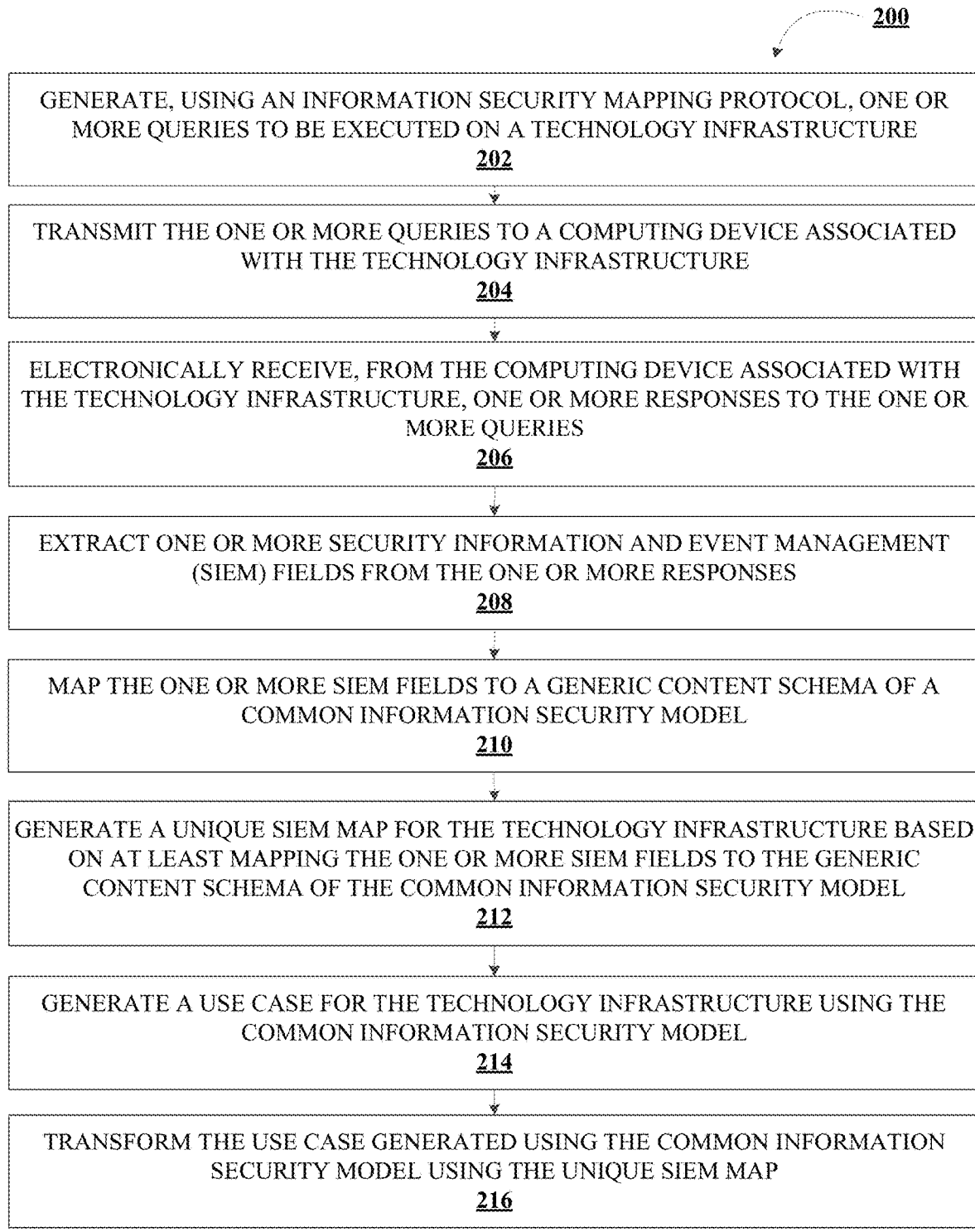
Figure 3:
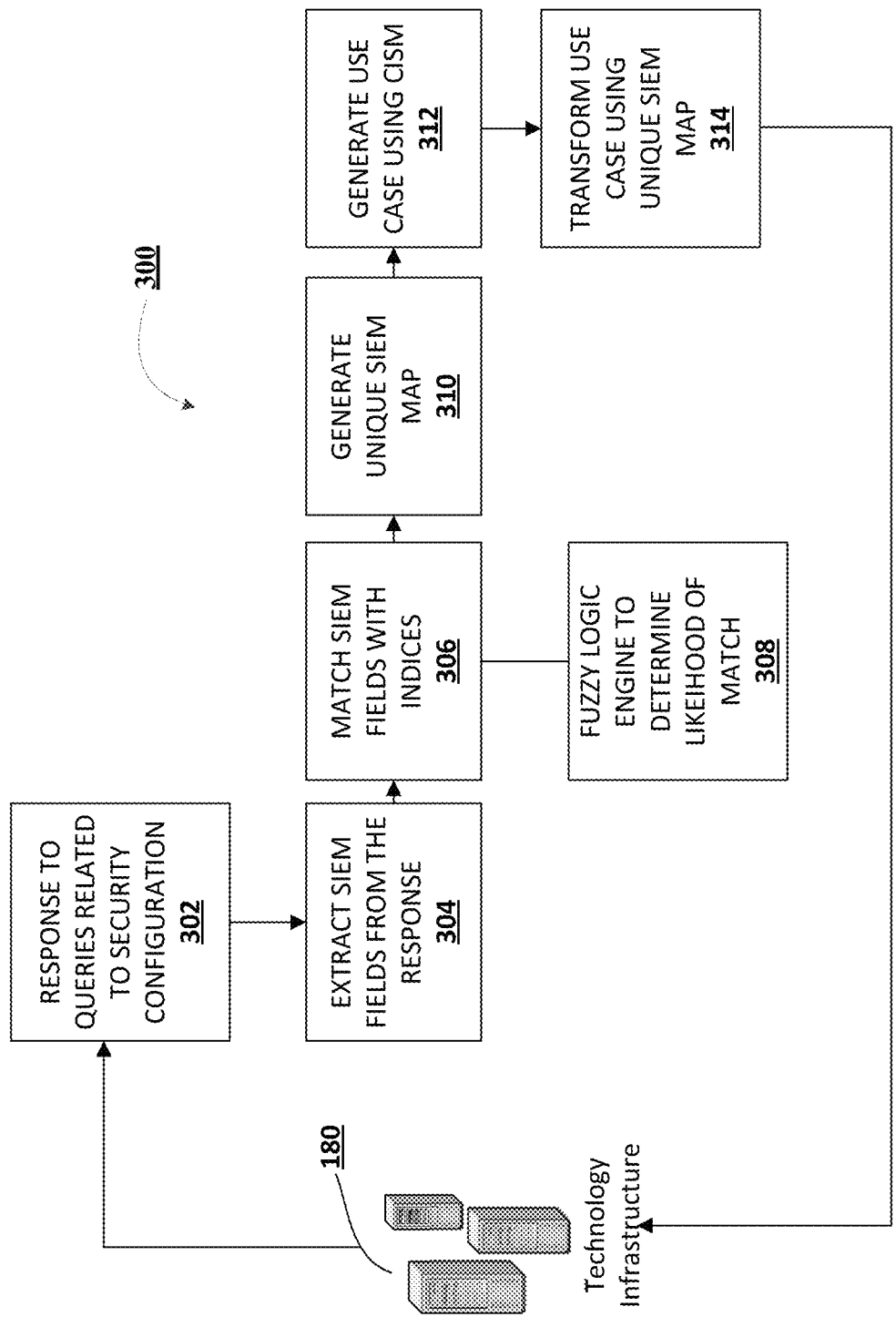

Having thus described embodiments of the invention in general terms, reference will now be made the accompanying drawings, wherein:

FIG. 1 illustrates technical components of a mapping system for mapping information security configurations across technology platforms, in accordance with an embodiment of the invention;

FIG. 2 illustrates a process flow for mapping information security configurations across technology platforms, in accordance with an embodiment of the invention; and FIG. 3 illustrates a block diagram for mapping information security configurations across technology platforms, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, organization, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be externally-controllable code that encapsulates powerful logic designed to perform or execute a specific type of function. In one aspect, an engine may be underlying source code that establishes file hierarchy, input, and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the protocol. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

Cyber Security Operations Centers (SOC) utilize numerous security tools to increase their visibility into the various facets of their entity's technology infrastructure. One of the main tools used to aggregate, correlate, and store the logs from these security tools is called a Security Information and Event Management (STEM) tool. The STEM tool in each organization is customized to the organization's environment and their specific needs, such as analysis, alerting, compliance, and/or the like. The difference in STEM implementations among various organizations lies primarily in how the data is organized and stored. Most SIEM tools have the ability to change how the fields within the data are aggregated, tagged, named, enriched, and stored, including the identifiable terms and indexes. This flexibility creates and infinite number of possible configuration options and mappings.

Naming convention variation is prevalent across different security tools, devices, and event sources, layered with variations in versions and composition of logging from tools. One example of these variations is seen between solutions such as Microsoft Security Event Logging, Sysmon, and OSQuery. These log sources monitor for system changes and potential security issues on Microsoft Windows Operating Systems and by default reference the same information using different field values such as command line parameters when a command is executed. Additionally, these logging sources can be configured with custom fields and data to enable more detailed logging. The nuances between these sources all logged into a STEM tool may result in manual editing of generic content as well as additional testing for efficiency, accuracy, and validation that the content fulfils the use case.

SIEMs are largely used by security analysts to threat hunt within the technology infrastructure and look for threats and suspicious activity and tactics, techniques, or procedures of bad actors. In general, threat hunting may refer to the process of proactively and iteratively searching through technology infrastructure of an entity to detect and isolate advanced threats that evade existing security solutions installed thereon. To execute a successful threat hunt, users typically should understand the who, what, when, where, and how an actor might approach to exploit a technology infrastructure. To this end, threat hunting typically involves generating and implementing a number of different use cases in the form of queries that identify, analyze, and notify the existence of a potential threat. Each use case is implemented in the form of input queries into a security tool, usually a SIEM, that initiates a response. This response is then developed in the form of dashboards and/or reports for alerting or visualization analysis so that a Cyber Security Operations Centers (SOC) user may start an investigation.

By implementing such use cases, the entity's technology infrastructure may be analyzed to provide an overview of its overall security posture. Each use case query may be targeted towards a specific aspect of the security tool identified by a field name, index, or the like. Due to the lack of standardized nomenclature among security tools within technology infrastructures, entities may have customized configurations, options, and/or naming conventions on how the fields within the data aggregated, tagged, named, enriched, and stored. Furthermore, in some instances the generation of a use case may be performed by a different entity than the entity that implements the use case. Thus, the nomenclature used in a use case may different from that used by an entity desiring to implement such use case. In such cases, implementing a use case may require manually mapping individual field names, terms, and indexes in the queries with any identifiable field names, terms, and indexes associated with the security tools in the technology infrastructure.

With each organization having a customized SIEM tool with particular nomenclature, implementing use cases with queries that can be mapped to each organization's security environment at scale with minimal manual intervention becomes a tedious task. This makes it challenging to create cross-platform information security content that will be usable by a wide variety of entities.

Embodiments of the present invention address the problem by implementing a unique on-boarding process that maps the customized security configurations of a technology infrastructure to the general content schema of a common information security model. This allows for any use case that is generated using the common information security model to be converted and customized to the security configurations of the entity's technology infrastructure. Furthermore, the present invention provides an improvement over existing technologies where each use case is manually customized to the security configurations of an entity's technology infrastructure. By implementing the on-boarding process for each entity's technology infrastructure, the present invention provides the functional benefit of generating a single global version of the use case using the common information security model, and then converting the global version of the use case into customized security configurations of each entity's technology infrastructure.

FIG. 1 presents an exemplary block diagram of the mapping system environment for mapping information security configurations across technology platforms 100, in accordance with an embodiment of the invention. FIG. 1 provides a unique mapping system that includes specialized servers and system communicably linked across a distributive network of nodes to perform the functions of the process flows described herein in accordance with embodiments of the present invention.

As illustrated, the mapping system environment 100 includes a network 110, a mapping system 130, a user input system 140, and technology infrastructure 180. The user input system 140 may be a mobile device or other non-mobile computing device. In some embodiments, the user input system 140 may be used by a user who is authorized to execute one or more interactions with the mapping system 130 and/or the technology infrastructure 180 using the one or more applications stored thereon. The one or more applications may be configured to communicate and interact with the mapping system 130 and/or the technology infrastructure 180, input information onto a user interface presented on the user input system 140, or the like. The applications stored on the user input system 140, the mapping system 130, and the technology infrastructure 180 may incorporate one or more parts of any process flow described herein.

As shown in FIG. 1, the mapping system 130, the user input system 140, and the technology infrastructure 180 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the mapping system 130, the user input system 140, and the technology infrastructure 180 may be used to implement the processes described herein. The mapping system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, electronic kiosk devices, blade servers, mainframes, or any combination of the aforementioned. The user input system 140 is intended to represent various forms of mobile devices, such as personal digital assistants, cellular telephones, smartphones, and other similar computing devices. The technology infrastructure 180 is intended to represent hardware components such as routers, network switches, server rooms/data centers, physical plant, computing devices (such as mobile devices, laptops, desktops, and/or the like), and/or the like, software components such as applications, network resources configured to enable communication between the various components, and personnel resources that operate the hardware components and the software components. The components shown here, their connections and relationships, and their functions, are meant to be exemplary only, and are not meant to limit implementations of the inventions described and/or claimed in this document.

In accordance with some embodiments, the mapping system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the mapping system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to mapping system 130 may be connected, with each system providing portions of the operations (e.g., as a server bank, a group of blade servers, or a multi-processor system). In some embodiments, the mapping system 130 may be a server managed by the business. The mapping system 130 may be located at the facility associated with the business or remotely from the facility associated with the business.

The memory 104 stores information within the mapping system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the mapping system 130 may dynamically utilize the volatile memory over the non-volatile memory by storing multiple pieces of information in the volatile memory, thereby reducing the load on the mapping system 130 and increasing the processing speed.

The storage device 106 is capable of providing mass storage for the mapping system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the mapping system 130 may be configured to access, via the network 110, the technology infrastructure 180. In some embodiments, the mapping system 130 may be configured to access, via the network 110, the Security Information and Event Management (STEM) tool associated with the technology infrastructure 180. SIEM tool is a monitoring system that aggregates data from different security sensitive components (hardware components and/or software components) associated with the technology infrastructure 180, and analyses the data, presents it, and issues alerts when triggering criteria is met. SIEM data is ingested from different sources within the technology infrastructure 180, including the network, security controls, servers, databases, applications, etc. and stored in dedicated databases. In some embodiments, the mapping system 130 may be configured to access, via the network 110, the dedicated databases that aggregate and store security information from various components within the technology infrastructure 180.

The high-speed interface 108 manages bandwidth-intensive operations for the mapping system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The mapping system 130 may be implemented in a number of different forms, as shown in FIG. 1. For example, it may be implemented as a standard server, or multiple times in a group of such servers. Additionally, the mapping system 130 may also be implemented as part of a rack server system or a personal computer such as a laptop computer. Alternatively, components from mapping system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the mapping system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the mapping system 130. In this regard, the mapping system 130 may be configured to establish a communication link with the user input system 140, whereby the communication link establishes a data channel (wired or wireless) to facilitate the transfer of data between the user input system 140 and the mapping system 130. In doing so, the mapping system 130 may be configured to access one or more aspects of the user input system 140, such as, a GPS device, an image capturing component (e.g., camera), a microphone, a speaker, or the like.

The user input system 140 may communicate with the mapping system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the mapping system 130.

The user input system 140 may also communicate audibly using audio codec 162, which may receive spoken information from a user and convert it to usable digital information.

Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the mapping system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a mapping system 130 that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the mapping system 130 can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the mapping system environment 100 illustrated in FIG. 1 is exemplary and that other embodiments may vary. As another example, in some embodiments, the mapping system 130 includes more, less, or different components. As another example, in some embodiments, some or all of the portions of the system environment 100 may be combined into a single portion. Likewise, in some embodiments, some, or all of the portions of the mapping system 130 may be separated into two or more distinct portions.

FIG. 2 illustrates a process flow for mapping information security configurations across technology platforms 200, in accordance with an embodiment of the invention. As shown in block 202, the process flow includes generating one or more queries to be executed on the technology infrastructure 180. As described herein, technology infrastructure 180 may refer to a set of information technology (IT) components including physical components (computer and networking hardware and facilities), and various software and network components, that may be used to develop, test, deliver, monitor, control, or support any IT activity within the entity. In some embodiments, the queries may be requests for information regarding security configurations of the technology infrastructure 180. In some embodiments, the one or more queries may be executed, iteratively, for a predetermined period of time (e.g., 30 days) until the most recent security configurations are captured.

Next, as shown in block 204, the process flow includes transmitting the one or more queries to a computing device associated with the technology infrastructure 180. In one aspect, the computing device associated with the technology infrastructure 180 may be configured to execute the queries on the technology infrastructure 180 and generate responses to the queries. In some embodiments, the responses to the queries may include information associated with the security configuration of the technology infrastructure 180. In one aspect, the responses may only include metadata associated with the security configuration and not the actual security logs that aggregate and record important events and interactions within the technology infrastructure 180. In this regard, the metadata associated with the security configuration may be descriptive of the security logs.

Next, as shown in block 206, the process flow includes electronically receiving, from the computing device associated with the technology infrastructure 180, one or more responses to the one or more queries. In some embodiments, the mapping system 130 may be configured to electronically receive an indication that the responses to the queries have been generated. In response to receiving the indication, the mapping system 130 may be configured to transmit a request to receive the one or more responses from the computing device of the technology infrastructure 180. In response to the request to receive, the mapping system 130 may be configured to electronically receive the one or more responses. In one aspect, the one or more responses to the one or more queries may be received in an exportable file format, such as comma separated values (CSV), tab separated values (TSV), extensible markup language (XML), or the like.

Next, as shown in block 208, the process flow includes extracting one or more Security Information and Event Management (STEM) fields from the one or more responses. In some embodiments, the one or more STEM fields may include one or more variables that are descriptive of the security configurations of the technology infrastructure 180. In one aspect, the one or more variables may include at least the source types and/or fieldnames associated with one or more security tools monitoring the technology infrastructure 180.

Next, as shown in block 210, the process flow includes mapping the one or more STEM fields to a generic content schema of a common information security model. In some embodiments, the common information security model may be a collection of generic content schema such as datasources, fields, field aliases, and/or the like (collectively referred to as "indices") that defines common nomenclature for machine-generated data. In one aspect, the mapping system 130 may be configured to compare the one or more STEM fields with one or more indices associated with the generic content schema to determine a match. In some embodiments, for each comparison between the one or more SIEM fields and the one or more indices associated with the generic content schema, the mapping system 130 may be configured to determine a likelihood of the match, using custom algorithms and logic.

In some embodiments, to determine a likelihood of match between the one or more STEM fields and the one or more indices associated with the generic content schema, the mapping system 130 may be configured to initiate a probabilistic fuzzy logic engine. When there is not a perfect match between the one or more STEM fields and the one or more indices associated with the generic content schema, the mapping system 130 may be configured to determine, using the probabilistic fuzzy logic engine, a "best guess" or a relative match between the STEM fields and the indices. To achieve this, the probabilistic fuzzy logic engine implements one or more fuzzy matching techniques to identify whether the SIEM fields and the indices agree or disagree on various identifiers. Accordingly, in some embodiments, the mapping system 130 may be configured to extract, using the probabilistic fuzzy logic engine, one or more identifiers associated with the one or more SIEM fields. In response, the mapping system 130 may be configured to compare the one or more identifiers associated with the one or more SIEM fields with one or more predetermined identifiers associated with the one or more indices. In one aspect, the one or more predetermined identifiers may be associated with one or more predetermined weights. In such cases, the likelihood of match may be based on at least a weighted matching of the one or more identifiers associated with the one or more SIEM fields and the one or more predetermined identifiers associated with the one or more indices.

In some embodiments, the mapping system 130 may be configured to implement any of the following applicable fuzzy matching techniques to determine a likelihood of the match: Levenshtein Distance (or Edit Distance), Damerau-Levenshtein Distance, Jaro-Winkler Distance, Keyboard Distance, Kullback-Leibler Distance, Jaccard Index, Metaphone 3, Name Variant, Syllable Alignment, Acronym, and/or any suitable fuzzy matching technique. In this way, the mapping system 130 may be configured to engage in a feedback loop to help identify any unmatched or mismatched fields, sources, or indexes based on SIEM field mapping. Furthermore, such a feedback loop allows the mapping system 130 to continually learn and understand the technology infrastructure 180 associated with the third party and with time, produce more consistent and validated results.

In some embodiments, the mapping system 130 may be configured to automatically map the one or more SIEM fields to the one or more indices associated with the generic content schema based on at least a highest likelihood of match between the one or more STEM fields and the one or more indices associated with the generic content schema. In some other embodiments, the mapping system 130 may be configured to determine that the likelihood of the match between the one or more STEM fields and the one or more indices associated with the generic content schema is greater than a predetermined threshold. In response, the mapping system 130 may be configured to map the one or more STEM fields to the generic content schema. In some other embodiments, the mapping system 130 may be configured to determine that the likelihood of match between the one or more STEM fields and the one or more indices associated with the generic content schema is lesser than the predetermined threshold. In response, the mapping system 130 may be configured to display the one or more SIEM fields and the one or more indices with corresponding likelihoods of match that are lesser than the predetermined threshold on the computing device (such as the user input system 140) of the user. In response, the mapping system 130 may be configured to electronically receive, via the computing device of the user, a user input to manually map the one or more SIEM fields with the likelihood of match being lesser than the predetermined threshold with the one or more indices associated with the generic content schema. In some embodiments, the mapping system 130 may be configured to electronically receive, via the computing device of the user, a user input to manually map the one or more STEM fields with the one or more indices associated with the generic content schema based on the likelihood of match, giving mapping controls to the user.

Next, as shown in block 212, the process flow includes generating a unique SIEM map for the technology infrastructure 180 based on at least mapping the one or more STEM fields to the generic content schema of the common information security model. By generating the unique SIEM map for the technology infrastructure 180, the mapping system 130 may be configured to map any content generated using the common information security model into information security content that is tailored to the technology infrastructure 180. Consequently, any use case generated using the common information security model is automatically customized to the security configurations of the technology infrastructure 180.

Next, as shown in block 214, the process flow includes generating a use case for the technology infrastructure 180 using the common information security model. As described herein, a use case may include queries that are designed to identify, analyze, and notify the existence of a potential threat. Each query may be targeted to generate a response from particular features of the security tool (such as the SIEM).

Next, as shown in block 216, the process flow includes transforming the use case generated using the common information security model using the unique STEM map. By transforming the use case using the unique SIEM map, the use case is now automatically tailored to the customized security configuration of the technology infrastructure 180. In some embodiments, in response to generating the use case, the mapping system 130 may be configured to transmit the use case to a computing device associated with the technology infrastructure 180 for deployment. In some other embodiments, in response to generating the use case, the mapping system 130 may be configured to deploy the transformed use case on the technology infrastructure 180.

FIG. 3 illustrates a block diagram 300 for mapping information security configurations across technology platforms, in accordance with an embodiment of the invention. At block 302, the mapping system 130 of the present invention is configured to electronically receive the responses to queries related to the security configuration of the technology infrastructure 180 of the entity. As discussed above, the mapping system 130 may be configured to generate the queries and provide the queries to the entity which is then executed on the technology infrastructure 180. At block 304, the mapping system 130 of the present invention extracts STEM fields from the response. At block 306, the mapping system 130 of the present invention determines a match between the SIEM fields and the indices associated with the generic content schema of the common information security model. If an exact match cannot be found, at block 308, as part of the matching process, the mapping system 130 of the present invention is configured to implement a fuzzy logic engine to determine a likelihood of match between the SIEM fields and the indices associated with the general content schema of the common information security model. At block 310, the mapping system 130 of the present invention is configured to generate a unique SIEM map based on at least matching the STEM fields with the indices. At block 312, the mapping system 130 of the present invention is configured to generate a use case using the common information security model (CISM). At block 314, the mapping system 130 of the present invention is configured to transform the use case using the unique SIEM map. Once the use case is transformed using the unique SIEM map, the mapping system 130 of the present invention is configured to transmit the transformed use case to the entity to be deployed on the technology infrastructure 180.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for mapping information security configurations across technology platforms, the system comprising:
   at least one non-transitory storage device; and
   at least one processing device coupled to the at least one non-transitory storage device, wherein the at least one processing device is configured to:
   generate one or more queries to be executed on a technology infrastructure;
   transmit the one or more queries to a computing device associated with the technology infrastructure;
   electronically receive, from the computing device associated with the technology infrastructure, one or more responses to the one or more queries;
   extract one or more security information and event management (SIEM) fields from the one or more responses;
   map the one or more SIEM fields to a generic content schema of a common information security model;
   generate a unique SIEM map for the technology infrastructure based on at least mapping the one or more SIEM fields to the generic content schema of the common information security model;
   generate a use case for the technology infrastructure using the common information security model; and
   transform the use case generated using the common information security model using the unique SIEM map.

2. The system of claim 1, wherein mapping the one or more SIEM fields to the generic content schema of a common information security model further comprises comparing the one or more SIEM fields with one or more indices associated with the generic content schema to determine a match.

3. The system of claim 2, wherein the at least one processing device is further configured to:
   determine the match between the one or more SIEM fields with the one or more indices associated with the generic content schema, wherein determining further comprises determining a likelihood of the match between the one or more SIEM fields and the one or more indices associated with the generic content schema based on at least a predetermined threshold.

4. The system of claim 3, wherein the at least one processing device is further configured to:
   automatically map the one or more SIEM fields to the one or more indices associated with the generic content schema based on at least a highest likelihood of match between the one or more SIEM fields and the one or more indices associated with the generic content schema.

5. The system of claim 3, wherein the at least one processing device is further configured to:
   determine that the likelihood of the match between the one or more SIEM fields and the one or more indices associated with the generic content schema is greater than the predetermined threshold; and
   map the one or more SIEM fields to the one or more indices associated with the generic content schema based on at least determining that the likelihood of the match is greater than the predetermined threshold.

6. The system of claim 3, wherein the at least one processing device is further configured to:
   determine that the likelihood of the match between the one or more SIEM fields and the one or more indices associated with the generic content schema is lesser than the predetermined threshold; and
   display, on the computing device of a user, the one or more SIEM fields with the likelihood of the match being lesser than the predetermined threshold.

7. The system of claim 6, wherein the at least one processing device is further configured to:
   electronically receive, via the computing device of the user, a user input to manually map the one or more SIEM fields with the likelihood of the match being lesser than the predetermined threshold with the one or more indices associated with the generic content schema.

8. The system of claim 3, wherein the at least one processing device is further configured to: determine the likelihood of the match between the one or more SIEM fields and the one or more indices associated with the generic content schema, wherein determining further comprises:
   initiating a probabilistic fuzzy logic engine;
   extracting, using the probabilistic fuzzy logic engine, one or more identifiers associated with the one or more SIEM fields;
   comparing the one or more identifiers associated with the one or more SIEM fields with one or more predetermined identifiers associated with the one or more indices, wherein the one or more predetermined identifiers are associated with one or more predetermined weights; and
   determining the likelihood of the match based on at least a weighted matching of the one or more identifiers associated with the one or more SIEM fields and the one or more predetermined identifiers associated with the one or more indices.

9. A computer program product for mapping information security configurations across technology platforms, the computer program product comprising a non-transitory computer-readable medium comprising code causing a first apparatus to:
   generate one or more queries to be executed on a technology infrastructure;
   transmit the one or more queries to a computing device associated with the technology infrastructure;

electronically receive, from the computing device associated with the technology infrastructure, one or more responses to the one or more queries;

extract one or more security information and event management (SIEM) fields from the one or more responses;

map the one or more SIEM fields to a generic content schema of a common information security model;

generate a unique SIEM map for the technology infrastructure based on at least mapping the one or more SIEM fields to the generic content schema of the common information security model;

generate a use case for the technology infrastructure using the common information security model; and transform the use case generated using the common information security model using the unique SIEM map.

10. The computer program product of claim 9, wherein mapping the one or more SIEM fields to the generic content schema of a common information security model further comprises comparing the one or more SIEM fields with one or more indices associated with the generic content schema to determine a match.

11. The computer program product of claim 10, wherein the first apparatus is further configured to:

determine the match between the one or more STEM fields with the one or more indices associated with the generic content schema, wherein determining further comprises determining a likelihood of the match between the one or more SIEM fields and the one or more indices associated with the generic content schema based on at least a predetermined threshold.

12. The computer program product of claim 11, wherein the first apparatus is further configured to:

automatically map the one or more SIEM fields to the one or more indices associated with the generic content schema based on at least a highest likelihood of match between the one or more SIEM fields and the one or more indices associated with the generic content schema.

13. The computer program product of claim 11, wherein the first apparatus is further configured to:

determine that the likelihood of the match between the one or more SIEM fields and the one or more indices associated with the generic content schema is greater than the predetermined threshold; and map the one or more SIEM fields to the one or more indices associated with the generic content schema based on at least determining that the likelihood of the match is greater than the predetermined threshold.

14. The computer program product of claim 11, wherein the first apparatus is further configured to:

determine that the likelihood of the match between the one or more SIEM fields and the one or more indices associated with the generic content schema is lesser than the predetermined threshold; and display, on the computing device of a user, the one or more SIEM fields with the likelihood of the match being lesser than the predetermined threshold.

15. The computer program product of claim 14, wherein the first apparatus is further configured to:

electronically receive, via the computing device of the user, a user input to manually map the one or more SIEM fields with the likelihood of the match being lesser than the predetermined threshold with the one or more indices associated with the generic content schema.

16. The computer program product of claim 11, wherein the first apparatus is further configured to:

determine the likelihood of the match between the one or more SIEM fields and the one or more indices associated with the generic content schema, wherein determining further comprises:

initiating a probabilistic fuzzy logic engine;

extracting, using the probabilistic fuzzy logic engine, one or more identifiers associated with the one or more SIEM fields;

comparing the one or more identifiers associated with the one or more SIEM fields with one or more predetermined identifiers associated with the one or more indices, wherein the one or more predetermined identifiers are associated with one or more predetermined weights; and determining the likelihood of the match based on at least a weighted matching of the one or more identifiers associated with the one or more SIEM fields and the one or more predetermined identifiers associated with the one or more indices.

17. A method for mapping information security configurations across technology platforms, the method comprising:

generating one or more queries to be executed on a technology infrastructure;

transmitting the one or more queries to a computing device associated with the technology infrastructure;

electronically receiving, from the computing device associated with the technology infrastructure, one or more responses to the one or more queries;

extracting one or more security information and event management (SIEM) fields from the one or more responses;

mapping the one or more SIEM fields to a generic content schema of a common information security model;

generating a unique SIEM map for the technology infrastructure based on at least mapping the one or more SIEM fields to the generic content schema of the common information security model;

generating a use case for the technology infrastructure using the common information security model; and transforming the use case generated using the common information security model using the unique SIEM map.

18. The method of claim 17, wherein mapping the one or more SIEM fields to the generic content schema of a common information security model further comprises comparing the one or more SIEM fields with one or more indices associated with the generic content schema to determine a match.

19. The method of claim 18, wherein the method further comprises:

determining the match between the one or more SIEM fields with the one or more indices associated with the generic content schema, wherein determining further comprises determining a likelihood of the match between the one or more SIEM fields and the one or more indices associated with the generic content schema based on at least a predetermined threshold.

20. The method of claim 19, wherein the method further comprises:

automatically mapping the one or more SIEM fields to the one or more indices associated with the generic content schema based on at least a highest likelihood of match between the one or more SIEM fields and the one or more indices associated with the generic content schema.

* * * * *

UNITED STATES PATENT AND TRADEMARK OFFICE
CERTIFICATE OF CORRECTION

PATENT NO. : 11,641,377 B2
APPLICATION NO. : 17/333393
DATED : May 2, 2023
INVENTOR(S) : Brandon Denker et al.

It is certified that error appears in the above-identified patent and that said Letters Patent is hereby corrected as shown below:

In the Claims

Column 19, Claim 11, Line 26 should read:
"determine the match between the one or more SIEM"

Signed and Sealed this
Fourth Day of July, 2023

Katherine Kelly Vidal
*Director of the United States Patent and Trademark Office*